(12) United States Patent
Eule

(10) Patent No.: US 6,274,956 B1
(45) Date of Patent: Aug. 14, 2001

(54) BASE PLATE, PARTICULARLY FOR ELECTRICAL MACHINES

(75) Inventor: Andreas-Alexander Eule, Kiel (DE)

(73) Assignee: Siemens Aktiengesellschaft, Munchen (DE)

(*) Notice: Subject to any disclaimer, the term of this patent is extended or adjusted under 35 U.S.C. 154(b) by 0 days.

(21) Appl. No.: 09/380,774

(22) PCT Filed: Feb. 23, 1998

(86) PCT No.: PCT/DE98/00535

§ 371 Date: Sep. 3, 1999

§ 102(e) Date: Sep. 3, 1999

(87) PCT Pub. No.: WO98/39834

PCT Pub. Date: Sep. 11, 1998

(30) Foreign Application Priority Data

Mar. 6, 1997 (DE) .............................................. 197 09 222

(51) Int. Cl.⁷ ....................................................... H02K 5/00
(52) U.S. Cl. ................................ 310/89; 310/51; 310/81; 310/88; 310/91
(58) Field of Search ................................... 310/89, 51, 81, 310/91, 88

(56) References Cited

U.S. PATENT DOCUMENTS

Re. 35,855 * 7/1998 Blaettner et al. ..................... 384/204
5,969,447 * 10/1999 Periyathamby et al. ............... 310/89

OTHER PUBLICATIONS

Patent Abstracts of Japan, JP 08 107655 A, Apr. 23, 1996 (Matsushita Electric Inc. Co. Ltd.)*.*
Patent Abstracts of Japan, JP 02 028542 A, Nov. 6, 1990 (Toshiba Corp.)*.*
Patent Abstract of Japan, JP 57 028542 A, Feb 16, 1982*.*

* cited by examiner

Primary Examiner—Elvin Enad
Assistant Examiner—Thanh Lam
(74) Attorney, Agent, or Firm—Kenyon & Kenyon

(57) ABSTRACT

An end shield is provided, particularly for electrical machines, which because of its design in sectors can be used to vary the natural system frequencies of the electric machine and foundation.

9 Claims, 1 Drawing Sheet

BASE PLATE, PARTICULARLY FOR ELECTRICAL MACHINES

FIELD OF THE INVENTION

The present invention relates to an end shield, particularly for electrical machines.

BACKGROUND INFORMATION

Electrical machines and the respective foundations have common natural system frequencies.

Systems composed of an electrical machine and foundation and whose natural system frequencies correspond to the excitation frequencies as rotational frequency and/or, preferably, in the case of 2-pole machines to twice the line frequency, lead to considerable vibration problems. These vibration problems are expressed in excessively high material stresses which lead to material damage if the permissible stress values of the material are exceeded. Moreover, large-scale functional impairments occur when certain deformation limits are exceeded which lead, for example, in the case of rotor vibrations of electric motors, to a bridging of the play between the rotor and housing. Motors which exhibit no vibration objections in acceptance tests where "hard" foundations are present can nevertheless lead to vibration problems for customers with "soft" foundations. It has so far been possible to conform to the vibration requirements of the standards and the customers only by methods which are complicated in terms of design and time-consuming such as, for example, by making changes to the foundation or the rotor (shaft diameter).

A further possibility of meeting these requirements consists in changing the bearing, for example, by changing the bearing span, by using sliding bearings instead of rolling bearings, or vice versa. These approaches entail high costs and lead to unplanned modification periods which lead to a loss of production for the customer.

SUMMARY

It is an object of the invention to be able to make quick and simple on-site changes to the typical natural system frequencies of the machine and foundation.

This object set is achieved according to the present invention by virtue of the fact that the end shield has at least two differently designed sectors. A sector is taken to mean both a circular section and an arbitrary region of the end shield. Different radial stiffnesses in the individual sectors are achieved by such a subdivision of the end shield into at least two differently designed sectors. By rotating the end shields in a plane perpendicular to the motor axis, it is possible to obtain motors of different stiffness, and, thus motors also of different natural frequencies. More than two differently designed sectors render it possible for the natural frequencies of the motors to be set in a stepwise fashion. Rotating the end shields can be performed on site without a large outlay. A substantial cost reduction and minimization of the conversion periods therefore result. The number of the sectors is rationally bounded above by the number of the fastening screws on the circumference of the end shield on the motor housing. If a further subdivision is provided, the sectors must be interconnected at their transition zones in such a way that they withstand the operating loads.

DETAILED DESCRIPTION

Figure 1:
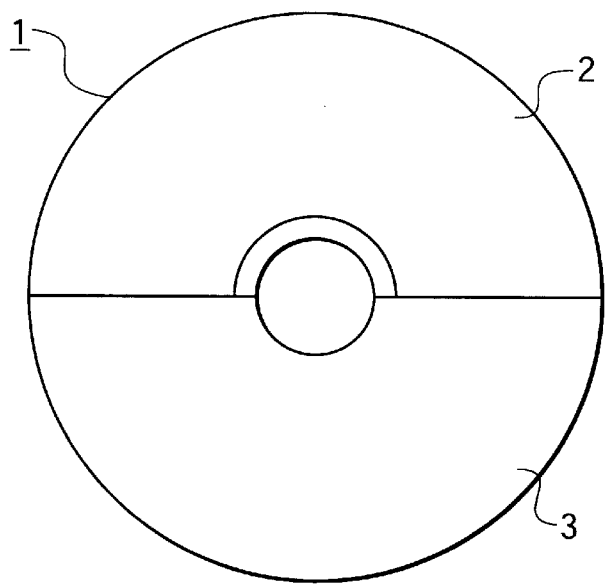
FIG. 1 shows a plan view of an end shield having two sectors of different material thickness, in accordance with an example embodiment of the present invention.
Figure 2:
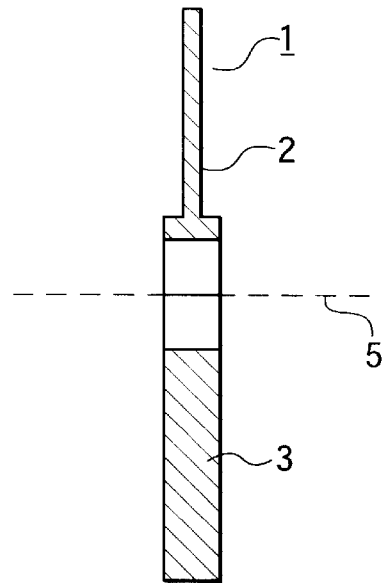
FIG. 2 shows a side view of the end shield according to the present invention.
Figure 3:
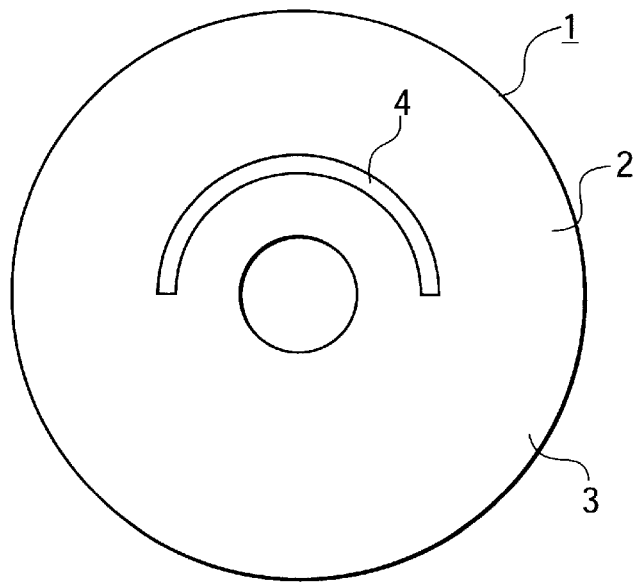
FIG. 3 shows an end shield, with one of two sectors having a slot design.

FIG. 1 shows an end shield 1 with two sectors 2, 3 of different material thickness. As a result, the two sectors 2, 3 have a different stiffness, as is also set by means of an end shield 1, represented in FIG. 3, with a coaxial slot design 4 of one of the two sectors 2, 3 represented. The slot can be filled with a soft sealing compound. This prevents particles of dirt from penetrating into the motor interior in conjunction with a sector of unchanged stiffness.

For on-site vibration problems of motors, these end shields 1 are rotated by 180° in a plane in a fashion perpendicular to the motor axis. The end shield can be rotated either manually or automatically. Consequently, the natural system frequencies of the machine and foundation are shifted into frequency ranges which are no longer excited by the speed of the machine and electric excitation.

What is claimed is:

1. An end shield for an electrical machine, comprising:
   sectors coupled to each other, a first one of the sectors having a different design from a second one of the sectors, a natural frequency of the electrical machine being varied on site by rotating the end shield in a plane perpendicular to an axis of the electrical machine.

2. An end shield for an electric machine, comprising:
   sectors coupled to each other, a first one of the sectors having a different design from a second one of the sectors, a natural frequency of the electrical machine being varied on site by rotating the end shield in a plane perpendicular to an axis of the electrical machine while the end shield remains installed on the electric machine,
   wherein the first one of the sectors is formed of a material that is different than a material forming the second one of the sectors.

3. The end shield according to claim 1, wherein the first one of the sectors has a material thickness that is different than a material thickness of the second one of the sectors.

4. The end shield according to claim 3, wherein a transition between the sectors is one of continuous and abrupt.

5. The end shield according to claim 1, wherein the sectors have at least one continuous and dead-end depression.

6. The end shield according to claim 5, wherein the depression is a slot, the slot being coaxial with the sectors.

7. The end shield according to claim 5, wherein the depression extends in a radial direction relative to the sectors.

8. A device for varying a natural frequency of an electrical machine comprising:
   an end shield including sectors, a first one of the sectors having a different design from a second one of the sectors, the natural frequency of the electrical machine being varied on site by rotating the end shield in a plane perpendicular to an axis of the electrical machine.

9. An end shield for an electric machine, comprising:
   sectors coupled to each other, a first one of the sectors having a different design from a second one of the sectors, a natural frequency of the electrical machine being varied on site by rotating the end shield in a plane perpendicular to an axis of the electrical machine while the end shield remains installed on the electric machine.

* * * * *